United States Patent
Wake et al.

(10) Patent No.: US 7,104,207 B2
(45) Date of Patent: Sep. 12, 2006

(54) AIR SEEDER TANK ARRANGEMENT

(75) Inventors: William A. Wake, Deer River, MN (US); Timothy A. Murray, Spirit Lake, IA (US)

(73) Assignee: CNH America LLC, Racine, WI (US)

( * ) Notice: Subject to any disclaimer, the term of this patent is extended or adjusted under 35 U.S.C. 154(b) by 170 days.

(21) Appl. No.: 10/834,676

(22) Filed: Apr. 29, 2004

(65) Prior Publication Data
US 2005/0241070 A1    Nov. 3, 2005

(51) Int. Cl.
*A01C 7/00* (2006.01)
*A01C 9/00* (2006.01)
*B67D 5/56* (2006.01)

(52) U.S. Cl. .................. 111/170; 111/186; 111/170; 222/129

(58) Field of Classification Search ............... 111/186, 111/129, 7.1, 7.3, 174, 175, 188, 95
See application file for complete search history.

(56) References Cited

U.S. PATENT DOCUMENTS

| 436,664 | A | * | 9/1890 | Jones ....................... 111/55 |
|---|---|---|---|---|
| 1,065,990 | A | * | 7/1913 | Walker ..................... 111/59 |
| 1,684,370 | A | | 9/1928 | Schuster |
| 2,230,846 | A | * | 2/1941 | Pettett ....................... 111/95 |
| 4,296,695 | A | | 10/1981 | Quanbeck |
| 4,700,640 | A | | 10/1987 | Andersson |
| 4,779,765 | A | | 10/1988 | Neumayer |
| 5,592,889 | A | | 1/1997 | Bourgault |
| 5,927,217 | A | | 7/1999 | Halford et al. |
| 6,148,748 | A | * | 11/2000 | Bardi et al. ............... 111/174 |
| 6,193,175 | B1 | | 2/2001 | Andersson et al. |
| 6,516,733 | B1 | * | 2/2003 | Sauder et al. ............. 111/180 |
| 6,527,205 | B1 | | 3/2003 | Andersson et al. |
| 2005/0103244 | A1 | * | 5/2005 | Mayerle et al. ........... 111/175 |

* cited by examiner

*Primary Examiner*—Daniel P. Stodola
*Assistant Examiner*—Julianne Cozad
(74) *Attorney, Agent, or Firm*—Rebecca Henkel

(57) ABSTRACT

An air seeder has two tanks for holding seed or other particulate matter. Each tank has a metering device at the bottom to meter out the contents of the tanks. A panel is positioned to cover and uncover a hole between the two tanks such that it can direct the contents of one tank into the other and also block off the metering device of the one tank. The panel is connected to a handle that extends outside the tanks so the operator can move the panel without entering the tank.

14 Claims, 3 Drawing Sheets

AIR SEEDER TANK ARRANGEMENT

FIELD OF THE INVENTION

This invention relates to generally to tanks for distributing particulate matter for agricultural applications. More particularly, it relates to tanks towed by tractors for distributing seed.

BACKGROUND OF THE INVENTION

Once common method of applying seed is to use an air seeding system or air seeder. Air seeding systems carry seed in one or more tanks that are coupled to manifolds. Each tank typically includes a metering device at the bottom, such as a rotating fluted wheel that transfers the seed or fertilizer from the bottom of the tank into an air-charged passageway just below the tank. Air is blown into the passageways and carries the seed or fertilizer into manifolds downstream that split into individual row seed tubes.

To provide flexibility, air seeding systems often use two or more tanks that are interconnected such that each can distribute seed or particulate matter separately, in separate air flow paths, or both can deliver seed together to a common air flow path. One common arrangement of such a system is shown in U.S. Pat. No. 5,592,889.

In the system of the '889 patent, three tanks 17, 18, and 19 are disposed adjacent to each other on an air seeder cart to feed any one (or all) of three tubes A, B, and C. Air is blown by two fans 1A and 1B into each of these three tubes to carry the seed or other particulate matter down tubes A, B, and C and thence to manifolds on the planter.

Each tank feeds its own metering auger located at the bottom of the tank. However, center tank 18 can be configured to feed any of the three augers. Seed in center tank 18 always goes straight down into its own auger, since no means is provided to block that flow off. But tank 18 can also feed adjacent tanks 17 and 19 by removing two cover plates 29 located on either side of tank 18 near the bottom. These plates cover openings 27, 28 in the bottom of tank 18. These openings join tank 18 to tanks 17 and 19. Seed that passes through these openings falls into tank 17 and 19 and is then routed through metering augers for tanks 17 and 19. In this manner, two tanks can be joined to a common metering auger and outlet.

It is not easy to open or close openings 27 and 28, however. The openings 27, 28 are small rectangular holes disposed on either side of tank 18 inside tanks 17 and 19. They are only accessible from inside tanks 17 and 19, respectively.

Even when the plates 29 are removed, however, seed in tank 18 still travels down to the metering auger for tank 18. To insure that seed in tank 18 goes through openings 27, 28 to adjacent tanks 17, 19, the metering auger for tank 18 must be disabled.

What is needed, therefore, is an improved seeding system that permits the operator to shift the flow of seed from one tank with a first metering device to a second tank with a second metering device that does not require the operator to either (1) enter either tank, or (2) disable the first metering auger.

It is an object of this invention to provide such a seeding system.

SUMMARY OF THE INVENTION

In accordance with a first aspect of the invention, an air seeder is provided that includes a first tank configured to hold particulate matter; a first particulate matter metering device coupled to the bottom of the first tank; a second tank configured to hold particulate matter; a second particulate matter metering device coupled to the bottom of the second tank; a panel disposed within the first tank to block the flow of particulate matter between the first and the second tanks; and an actuator coupled to the panel, wherein the actuator extends outside the first and second tanks, and further wherein the actuator is manipulable to move the panel from a first position in which particulate flow from the first and second tanks are joined and directed to the second metering device, and a second position in which flow from the first tank is directed to the first metering device and particulate flow from the second tank is directed to the second metering device.

The first and second tanks may share a common wall, and the panel may be configured to cover and uncover an aperture in said common wall when moved between its first and second positions. The actuator may be a manually operable lever extending outside the first and second tanks. The air seeder may further include a hinge fixed to an edge of the panel and to a wall of the first tank. The edge of the panel may be a lower edge of the panel. The panel may be configured to pivot through an angle of between 45 and 135 degrees when moved between its first and second position. The panel may abut an outer wall of the first tank in the first position and abut an inner wall of the second tank in the second position.

DETAILED DESCRIPTION OF THE PREFERRED EMBODIMENTS

In the discussion herein, the term "seed" should be understood to include not just seed, but also grain, kernels, fertilizer, pesticides, herbicides or other particulate matter that may be applied to the ground for agricultural purposes.

Figure 1:
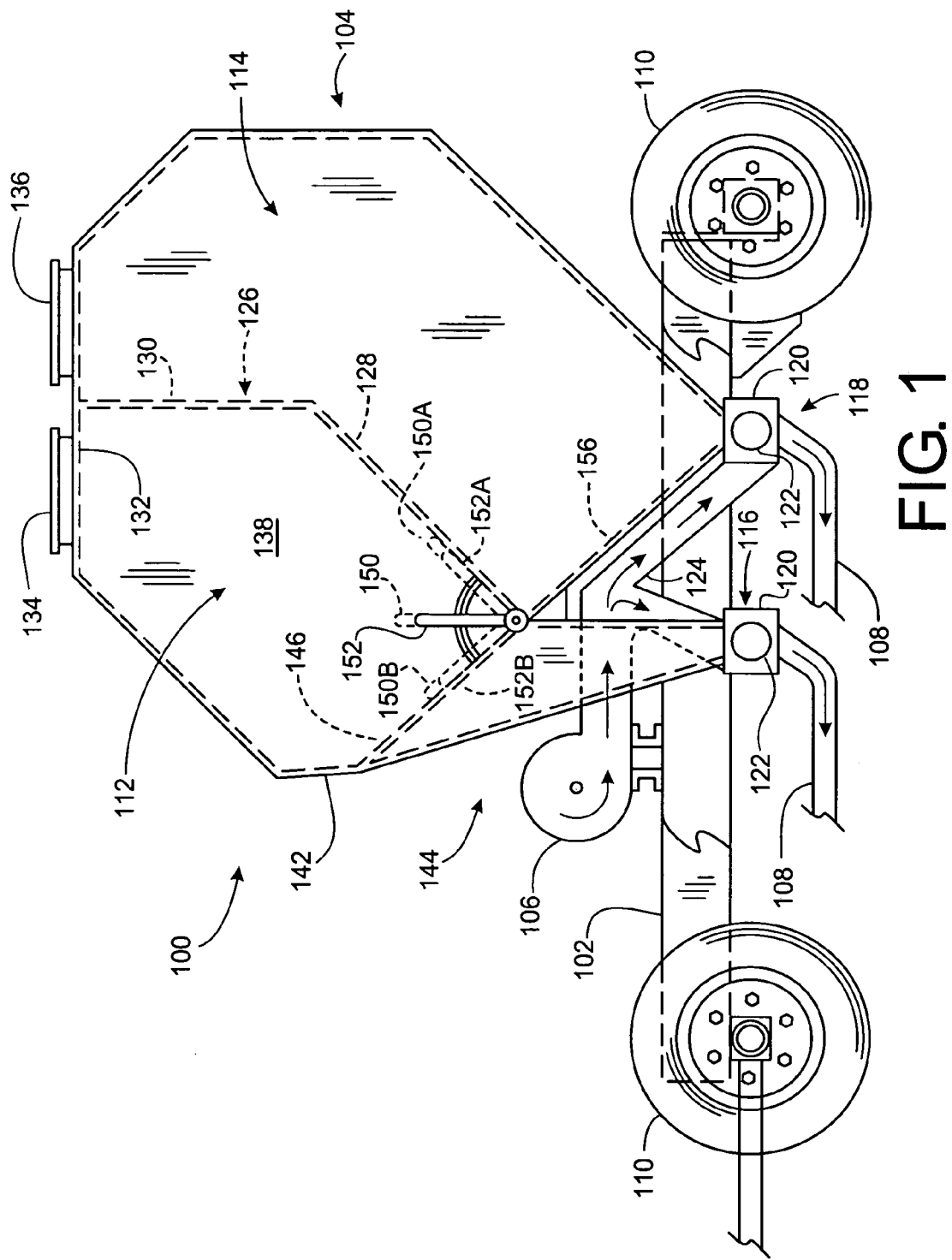
FIG. 1 is a left side view of an air system in accordance with the present invention.

Referring to FIG. 1, an air system 100 includes a frame 102 upon which is mounted a tank assembly 104, a blower 106 and conduits 108.

Frame 102 of air system 100 may be mounted on wheels 110 as shown, or it may be mounted directly on an implement such as a tool bar that has ground openers or similar system for receiving the seed distributed by the air seeder.

Tank assembly 104 defines two tanks, a first tank 112 and a second tank 114. The tank assembly further includes two metering devices 116, 118 that are coupled to the bottom of tanks 112 and 114, respectively. Each metering device includes a housing 120. The housing supports and encloses a fluted cylinder or an auger 122 that is driven by a hydraulic, pneumatic, electric or mechanical actuator (not shown), for example a linear actuator or rotary actuator.

Whenever the actuator rotates the fluted cylinder or auger, seed in the bottom of the tanks that is resting in the flutes of the cylinder at the inlet (i.e. top) of the metering device is drawn around in the housing 120 as the cylinder 122 rotates. When it is rotated through the housing to the outlet (i.e. the bottom) of the housing, it is released into the conduits 108 which are connected to the housing outlet.

Seed is swept away from the outlet as soon as it falls into conduit 108, by a stream of air provided by blower 106. A plenum 124 is coupled to and between blower 106 and metering devices 116 and 118 to direct the flow of blower air into the outlets of the metering devices and thence to conduits 108 carrying the seed at the outlets of the metering devices with it.

Conduits 108 extend from the outlets of the metering devices toward the ground openers or other components that receive the seeds and place them in the ground. These other components are well known and form no part of the present invention.

First tank 112 and second tank 114 share a common internal wall 126 that has a lower portion 128 disposed at a 45 degree angle and an upper portion 130 that is vertical. The tanks also share a common top wall 132 that has two hatches 134, 136 extending therethrough. Hatch 134 provides seed fill opening in the top of tank 112. Hatch 136 provides a seed fill opening in the top of tank 114.

Figure 2:
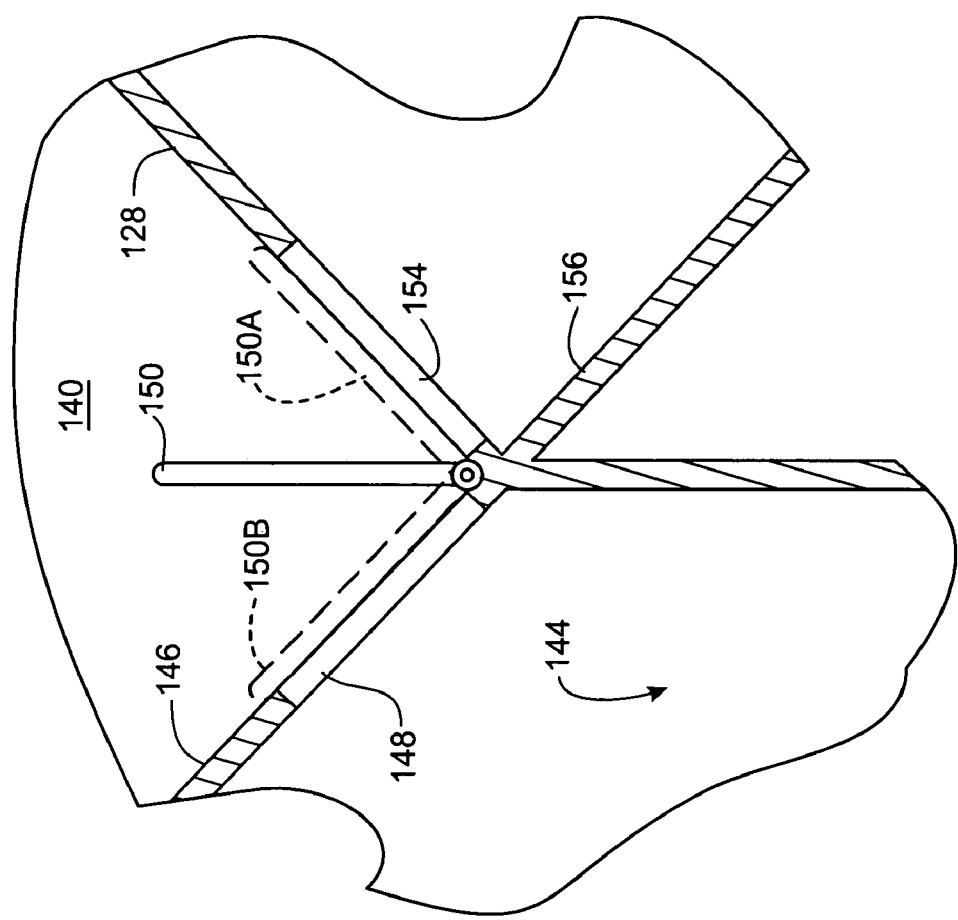
FIG. 2 is a cross sectional left side view of the air system of FIG. 1 in the vicinity of pivotable panel 150 with handle 152 and left sidewall 138 removed. The cross section is made by a vertical and longitudinally extending cutting plane.
Figure 3:
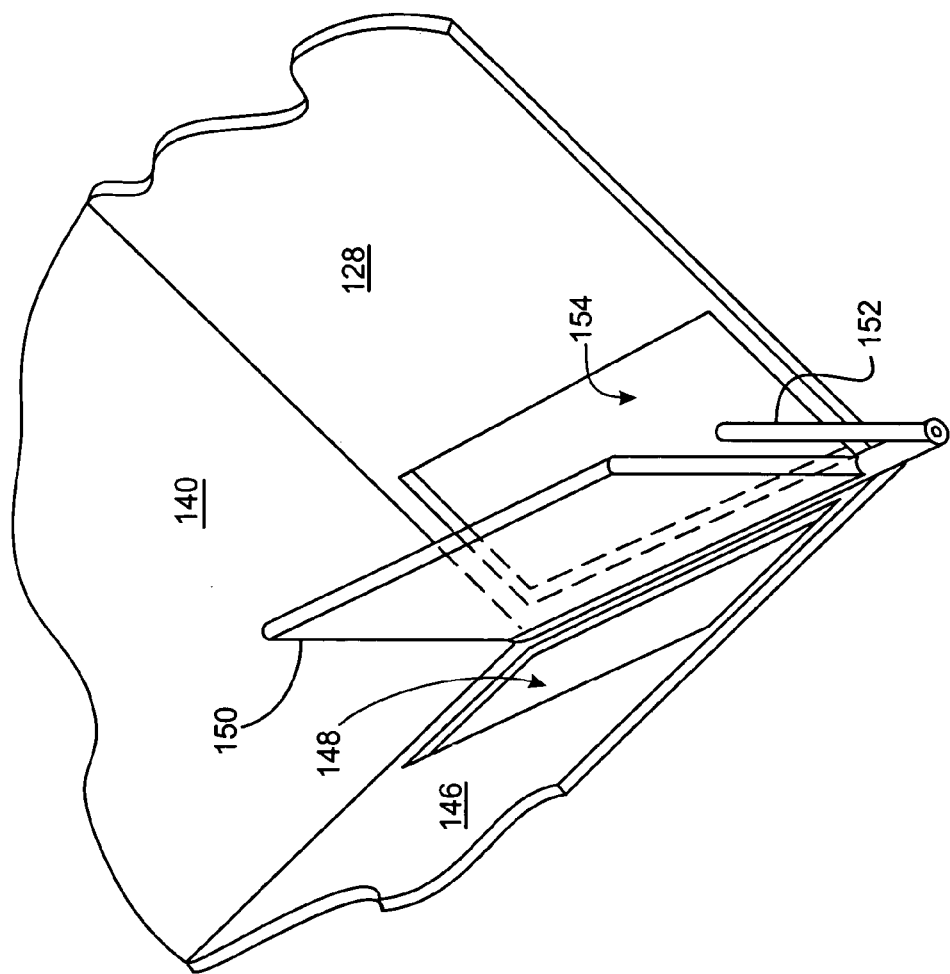
FIG. 3 is a fragmentary perspective view of the air system of FIGS. 1 and 2 showing portions of wall 146 and its opening 148, portions of wall 128 and its opening 154, and portions of side wall.

Tank 112 also has left side wall 138, right side wall 140 (FIG. 3), and front wall 142, in addition to its shared common back wall 126 and top wall 132 mentioned in the previous paragraph. Tank 112 also has a lower chute-shaped portion 144 that extends downward from internal panel or wall 146 to the inlet of metering device 116. Panel 146 has an opening or aperture 148 (FIGS. 2 and 3) through which seed passes. Opening 148 may be selectively closed or opened by the operator. To close opening 148, the operator moves pivotable panel 150 counterclockwise (as shown in the FIGURES), until it covers and blocks opening 148. Panel 150 functions as a door or valve to block the flow of seed from passing through opening 148.

Panel (or valve) 150 is pivotally coupled to tank 112 and is fixed to an actuator 152 here shown as a manually operated handle. Panel actuator or handle 152 is disposed on the outside of tank 112 where it can be grasped and rotated by the operator without the operator having to enter the tank. The handle and the panel pivot together over a range of 45 to 135 degrees, and more preferably over a range of about 90 degrees as shown herein.

Handle 152 has two limits of travel, a clockwise limit 152A and a counterclockwise limit 152B. Pivotable panel 150 also has two extreme limits of travel, a clockwise limit 150A and a counterclockwise limit 150B. Handle 152 rotates through an angle of 90 degrees when the operator moves it from position 152A to 152B (see FIG. 1), and vice versa.

Since handle 152 is fixed to panel 150, this handle movement causes panel 150 to rotate through an angle of 90 degrees when it moves from position 150A to 150B (see FIG. 2) and vice versa.

To close opening 148, the operator grasps handle 152 and rotates it counterclockwise until it reaches position 152B and stops. Panel 150 moves to position 150B in which it abuts internal panel 146.

When the handle 152 and panel 150 are in this position, seed is prevented from falling down into lower chute portion 144 of tank 112. This effectively blocks all further flow of seed from the upper portion of tank 112 into metering device 116.

To open opening 148, the operator does just the reverse: he grasps handle 152 and rotates it clockwise until it is in position 152A (FIG. 1) and panel 150 is in position 150A (FIG. 2) abutting the lower portion of internal wall 128.

Panel 150 serves a second function when it is in position 152A: closing off opening or aperture 154, which is disposed in lower portion 128 of internal wall 126. This opening (FIGS. 2–3) is disposed in the lower portion of wall 126 right where internal panel 146 abuts a front bottom wall 156 of tank 114. Both panel 146 and wall 156 are disposed at a 45 degree angle.

When panel 150 is in position 150B, it closes off opening 148 in panel 146, preventing seed from entering lower chute portion 144 of tank 112. With opening 148 closed off, seed can freely flow down panel 146 in tank 112, across panel 150, and then through opening 156 and onward into tank 114. Once in tank 114, the seed falls down into and is metered by metering device 118 into conduit 108, thereby bypassing metering device 116 of tank 112 entirely.

Thus, by rotating external handle 152 counterclockwise, moving it from position 152A to 152B, the operator can simultaneously open up a passageway (opening 154) between tank 112 and 114 and block off flow to the metering device 116 for tank 112, thus causing seed in tank 112 to flow into tank 114 and thence into its metering device 118.

From the foregoing, it will be observed that numerous modifications and variations can be effected without departing from the true spirit and scope of the novel concept of the present invention. For example, handle 152 need not be manually operated. Further, there may be additional tanks mounted on the frame having additional metering devices. Yet further, the frame need not be supported by wheels, but can be supported on a tool bar or other structure, or on a planter.

It will be appreciated that the present disclosure is intended as an exemplification of the invention, and is not intended to limit the invention to the specific embodiment illustrated. The disclosure is intended to cover by the appended claims all such modifications as fall within the scope of the claims.

The invention claimed is:

1. An air seeder, comprising:
   a first means for holding particulate matter;
   a first means for metering particulate matter that is coupled to the first means for holding;
   a second means for holding particulate matter;
   a second means for metering particulate matter coupled to the second means for holding;
   a means for directing particulate matter flow that is disposed within the first means for holding; said means for directing comprising an inner panel; and
   a means for actuating the means for directing, wherein the means for actuating extends outside the first and second holding means, the means for directing being movable between
   (1) a first position in which flow from the first and second means for holding are joined and directed to the second means for metering; and
   (2) a second position in which particulate flow from the first means for holding is directed to the first means for metering and particulate flow from the second means for holding is directed to the second means for metering,
   wherein the first and second means for holding share a common wall having a first aperture therethrough, wherein the first means for holding includes an internal wall having a second aperture therethrough leading to the first means for metering, wherein a means for pivoting the means for directing is located where the internal wall abuts the common wall, wherein the first position is a first limit and the second position is a second limit that the means for directing travels between, wherein the means for directing at the first limit abuts against and blocks particulate flow through the first aperture in the common wall to the second means for metering, and wherein the means for directing at the second limit abuts against and blocks particulate flow through the second aperture in the inner panel to the first means for metering.

2. The air seeder of claim 1, wherein the means for actuating is a manually operable handle extending outside the first and second means for holding.

3. The air seeder of claim 2, wherein the means for pivoting is coupled at a lower edge of the means for directing.

4. An air seeder, comprising:
a first tank configured to hold particulate matter;
a first particulate matter metering device coupled to the bottom of the first tank;
a second tank configured to hold particulate matter;
a second particulate matter metering device coupled to the bottom of the second tank;
a panel disposed within the first tank and configured to block flow of the particulate matter between the first and the second tanks; and
an actuator coupled to the panel, wherein the actuator extends outside the first and second tanks, and further wherein the actuator is manipulable to move the panel between
(1) a first position in which particulate flow from the first and second tanks are joined and directed to the second metering device and flow from the first tank to the first metering device is blocked, and
(2) a second position in which particulate flow from the first tank is directed to the first metering device and particulate flow from the second tank is directed to the second metering devices wherein the first and second tanks share a common wall having a first aperture therethrough, wherein the first tank includes an internal wall having a second aperture therethrough leading to the first metering device, wherein the internal wall and the common wall abut at a pivot point about which the panel rotates, wherein the first position is a first limit and the second position is a second limit that the panel travels between, wherein the panel at the first limit abuts against and blocks the particulate matter from passing through the first aperture in the common wall to the second metering device, and wherein the panel at the second limit abuts against and blocks the particulate matter from passing through the second aperture in the inner panel of the first tank to the first metering device.

5. The air seeder of claim 4, wherein the actuator is a manually operable handle.

6. The air seeder of claim 5, wherein the panel includes a lower edge about which the panel rotates.

7. The air seeder of claim 6, wherein the panel is configured to pivot through an angle of between 45 and 135 degrees when moved between its first and second positions.

8. An air seeder, comprising:
a first particulate tank;
a first metering device coupled to the outlet of the first tank;
a second particulate tank;
a second metering device coupled to the outlet of the second tank;
a valve member disposed within the first tank to block the flow of particulate matter between the first and the second tanks; and
a valve actuator coupled to the valve member, wherein the actuator extends outside the first and second tanks, and further wherein the actuator is manipulable to move the valve member from
(1) a first position in which particulate flow from the first and second tanks are joined and directed to the second metering device, and (2) a second position in which particulate flow from the first tank is directed to the first metering device and particulate flow from the second tank is directed to the second metering devices,
wherein the first and second tanks share a common wall having a first aperture therethrough, wherein the first tank includes an internal wall having a second aperture therethrough leading to the first metering device, wherein the internal wall and the common wall abut at a pivot point about which the valve member rotates, wherein the first position is a first limit and the second position is a second limit that the valve member travels between, wherein the valve member at the first limit abuts against and blocks particulate flow through the first aperture in the common wall to the second metering device, and wherein the valve member at the second limit abuts against and blocks particulate flow through the second aperture in the inner panel of the first tank to the first metering device.

9. The air seeder of claim 8, wherein the valve actuator is a manually operable handle extending outside the first and second tanks.

10. The air seeder of claim 9, wherein the valve member is configured to pivot through an angle of between 45 and 135 degrees when moved between its first and second positions.

11. A method of coupling a first tank of an air seeder to a second tank of the air seeder, the first tank having a first metering device disposed at the bottom thereof, and the second tank having a second metering device disposed at the bottom thereof, the method comprising the steps of:
rotating a valve element in a first direction from a first limit position of travel;
opening a first passageway for particulate flow through the common wall between the first tank and the second tank with the rotating step in the first direction;
blocking particulate flow through a second passageway in an inner wall of the first tank to the first metering device with the rotating step in the first direction;
limiting travel of the valve element in the first direction abutted against the inner wall of the first tank:
rotating the valve element in a second direction opposite the first direction;
opening the second passageway in the inner wall of the first tank to allow particulate flow from the first tank to the first metering device with the rotating step in the second direction;
blocking particulate flow through a first passageway in the common wall of the first tank with the rotating step in the second direction; and
limiting travel of valve element in the second direction at a second limit position of travel abutted against the common wall between the first tank and the second tank.

12. The method of claim 11, wherein the step of opening the first passageway includes the step of moving the valve element to uncover the first passageway.

13. The method of claim 11, wherein the step of opening the first passageway between the first tank and the second tank includes the step of creating a particulate flow path from the first tank to the second metering device.

14. The method of claim 11, wherein the step of rotating the valve element in the first direction and the step of rotating the valve element in the second direction occurs about a pivot located where the inner wall of the first tank abuts the common wall between the first and second tanks.

* * * * *